US006184896B1

United States Patent
Sowizral et al.

(10) Patent No.: US 6,184,896 B1
(45) Date of Patent: Feb. 6, 2001

(54) SYSTEM AND METHOD FOR IMPROVED RENDERING OF GRAPHICAL ROTATIONS

(75) Inventors: Henry A. Sowizral, Los Altos, CA (US); Karel Zikan, Seattle, WA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/227,428

(22) Filed: Jan. 8, 1999

(51) Int. Cl.$^7$ .................................................. G06T 3/60

(52) U.S. Cl. .................. 345/437; 345/439; 382/296; 382/298

(58) Field of Search .................................. 345/437, 436, 345/439, 125, 123, 126, 121, 426, 421, 419, 427, 425; 382/153, 295, 296, 293; 348/583; 199/73

(56) References Cited

U.S. PATENT DOCUMENTS

| | | | |
|---|---|---|---|
| 5,295,237 | * | 3/1994 | Park ..................................... 345/437 |
| 5,568,600 | * | 10/1996 | Kaba .................................... 700/251 |
| 5,581,665 | * | 12/1996 | Sugiura et al. ....................... 345/437 |
| 6,018,349 | * | 1/2000 | Szeliski et al. ....................... 345/425 |
| 6,064,393 | * | 5/2000 | Lengyel et al. ....................... 345/427 |

OTHER PUBLICATIONS

Flusser, J., "Invariant shape description and measure of object similarity", Image Processing and its Applications, 1992, International Conference on 1992, pp. 139–142.*

Johnson, M., "A fixed-point DSP for graphics engines", IEEE Micro, vol. 9 Issue: 4, Aug. 1989, pp. 63–77.*

* cited by examiner

Primary Examiner—Mark R. Powell
Assistant Examiner—Thu-Thao Havan
(74) Attorney, Agent, or Firm—Conley, Rose & Tayon P.C.; Jeffrey C. Hood

(57) ABSTRACT

A system and method for rendering of graphical rotations. The system includes a processor coupled to system memory, a display device, and optionally a graphics accelerator. The processor operates on a matrix M with a matrix operator having the properties of consistency on rotations and attraction to rotations. The matrix operator may be applied more than once to achieve greater error attenuation. The processor, or alternatively the graphics accelerator, performs image graphical rendering calculations using resultant matrix L obtained from applying the matrix operator. A first approximate rotation representing a previous orientation for a graphical object, and a second approximate rotation matrix representing a desired rotation to be applied to the graphical object, are multiplied to obtain matrix M which represents an updated orientation for the graphical object. The second approximate rotation matrix is generated in response to a sensor input provided by a user or from orientation information stored in a data structure. Furthermore, an iterative method for generating a sequence of approximate rotation matrices in response to user input or stored control information, and for rendering a series of rotation updates of a graphical object on a display screen is also contemplated. The matrix M representing the result of a matrix multiplication step is updated periodically or pseudo-periodically using a matrix operator having the consistency and attraction properties.

29 Claims, 10 Drawing Sheets

SYSTEM AND METHOD FOR IMPROVED RENDERING OF GRAPHICAL ROTATIONS

FIELD OF THE INVENTION

The present invention relates generally to the computation of rotations in any dimension, and more particularly, to graphics applications which require the multiplication of two or more rotation matrices or approximate rotation matrices.

BACKGROUND OF THE INVENTION

Modern computer graphics extensively uses matrices and matrix methods to represent graphical objects and operations. For example, in the context of 2D graphics, a point P may be represented as a column vector $P=[x \ y]^t$, and multiplied by the rotation matrix $$R(\theta) = \begin{bmatrix} \cos(\theta) & -\sin(\theta) \\ \sin(\theta) & \cos(\theta) \end{bmatrix}$$

in order to achieve a counterclockwise rotation by angle $\theta$. In other words, the point $$P'\begin{bmatrix} x' \\ y' \end{bmatrix} = R(\theta) \cdot P = \begin{bmatrix} \cos(\theta) & -\sin(\theta) \\ \sin(\theta) & \cos(\theta) \end{bmatrix} \cdot \begin{bmatrix} x \\ y \end{bmatrix}$$

is the rotated image of point P. It is noted that the superscript t associated with a matrix or vector argument indicates transposition.

Similarly, in the context of 3D graphics, a point P may be represented as a column vector $P=[x \ y \ z]^t$, and multiplied by a 3×3 rotation matrix R in order to achieve a 3D rotation; i.e. the resultant point $P'=R \cdot P$ is the rotated image of point P. For example, the matrix $$R_z(\theta) = \begin{bmatrix} \cos(\theta) & -\sin(\theta) & 0 \\ \sin(\theta) & \cos(\theta) & 0 \\ 0 & 0 & 1 \end{bmatrix}$$

achieves a rotation of angle $\theta$ about the z axis when multiplied by point P. Rotations about the x and y axes respectively are achieved by the matrices $$R_x(\phi) = \begin{bmatrix} 1 & 0 & 0 \\ 0 & \cos(\phi) & -\sin(\phi) \\ 0 & \sin(\phi) & \cos(\phi) \end{bmatrix}, R_y(\varphi) = \begin{bmatrix} \cos(\varphi) & 0 & \sin(\varphi) \\ 0 & 1 & 0 \\ -\sin(\varphi) & 0 & \cos(\varphi) \end{bmatrix}$$

respectively.

It is a basic geometric fact that any 3D rotation can be achieved by applying in succession a rotation about the x axis, a rotation about the y axis, and a rotation about the z axis. [Similar statements can be made about any ordering of the axial rotations.] Thus, the rotation matrices may be defined as the set of all matrices generated by the products $R_x(\phi) \cdot R_y(\varphi) \cdot R_z(\theta)$ where the angles $\phi$, $\varphi$, and $\theta$ vary freely. However, one may equivalently (and more usefully) characterize the rotation matrices as the set of matrices A which (a) are orthogonal and (b) have determinant equal to one. To say that a matrix A is orthogonal means that (i) all its rows have length one, and (ii) each row is perpendicular to the other rows. In mathematical notation, the orthogonality conditions (i) and (ii) may be summarized by the matrix equation $AA^t=I$, where the matrix I is the identity matrix.

Using the later characterization of rotation matrices as orthogonal matrices having determinant one, it is an elementary exercise to show that the product of two rotation matrices is itself a rotation matrix. In fact, a product of arbitrarily many rotation matrices is also a rotation matrix.

In graphical computing systems, it is quite typical to represent a graphical object as a collection of vertices $\{P_i\}$. In order to rotate the graphical object, each vertex $P_i$ of the collection is multiplied by a rotation matrix R which represents the desired rotation. The resultant vertices $P'_i=RP_i$ from the matrix multiplication may be used to render the rotated graphical object on a display screen.

FIG. 1 illustrates two successive rotations of a cube centered about the origin of a coordinate system $\{x,y,z\}$. In an initial orientation $U_0$, the cube is aligned with edges parallel to the coordinate axes. A first rotation of the cube may be achieved by multiplying the vertices $\{P_i\}$ of the cube in the initial orientation $U_0$ by a first rotation matrix $R_1$. For example, vertex $P_1$ of the cube in orientation $U_0$ may be represented as a column vector $P_1=[x_1 \ y_1 \ z_1]^t$, where $x_1$, $y_1$, and $z_1$ are the coordinates of vertex $P_1$ with respect to the coordinate system $\{x,y,z\}$. The rotated image of vertex $P_1$, depicted as vertex $P'_1$ in orientation $U_1$, is determined by the matrix-vector product $P'_1=R_1 \cdot P_1$. Similarly, each vertex $P_i$ of the cube in orientation $U_0$ is multiplied by the rotation matrix $R_1$ to determine a corresponding vertex $P'_i$ in orientation $U_1$. The vertices $\{P'_i\}$ may be used to render the cube in orientation $U_1$ on a display screen.

A second rotation may be achieved by multiplying the vertices $\{P'_i\}$ of the cube in orientation $U_1$ by a second rotation matrix $R_2$. Thus, the vertices $\{P''_i\}$ of the cube in orientation $U_2$, i.e., after the second rotation, are given by $P''_i=R_2 \cdot P'_i$. It is noted that the combined effect of the two rotations may be achieved with a single rotation matrix R equal to the matrix product $R_2R_1$; i.e., multiplying the vertices $\{P_i\}$ of the cube in orientation $U_0$ by the rotation matrix $R=R_2R_1$ generates the corresponding vertices $\{P''_i\}$ in orientation $U_2$. Thus, the rotation matrix R may be interpreted as a representation of orientation $U_2$. In fact, each orientation $U_i$ may be represented by the matrix required to generate the vertices of that orientation from the initial orientation $U_0$. Thus, initial orientation $U_0$ is represented by the identity matrix I, and orientation $U_1$ is represented by the rotation matrix $R_1$.

Quite often in computer graphics, it is desirable to apply a series of rotations in succession to a graphical object. As described above, the graphical object is typically represented in an initial orientation as a collection of vertices $\{P_i\}$. Given a series of rotation matrices $R_1, R_2, \ldots, R_n$ which represent the desired rotations, there are two fundamental methods for computing the vertices of the graphical object after each successive rotation. Let $\{P_i^{(k)}\}$ denote the vertices of the graphical object after the first k rotations have been applied where k varies from 1 to n. In a first method, the vertices of a current orientation are computed in terms of the vertices of the previous orientation. Namely, $$P_i^{(k)}=R_k \cdot P_i^{(k-1)}$$

where $P_i^{(0)}=P_i$. After the vertices $\{P_i^{(k)}\}$ are computed, they are typically used to render the updated orientation of the graphical object on a display screen.

In a second method, the succession of rotations may be generated by iteratively computing a sequence of matrices $U_k$ according to the relation $U_k=R_k U_{k-1}$ with $U_0=I$. After matrix $U_k$ is computed, the vertices $\{P_i^{(k)}\}$ of the graphical object in the $k^{th}$ orientation may be computed directly from the vertices $\{P_i\}$ of the initial orientation using the relation $$P_i^{(k)} = U_k \cdot P_i.$$

Thus, the matrix $U_k$ represents the orientation of the graphical object after the first k rotations have been applied. This second method for generating a series of rotations is generally preferred over the first method for reasons which will become fully apparent below.

By repeatedly applying the recursive relation $U_k = R_k U_{k-1}$ for successively decreasing values of the index k, it follows that $$U_k = R_k R_{k-1} \ldots R_2 R_1.$$

Since the arbitrary product of rotation matrices is itself a rotation matrix, each of the orientation matrices $U_k$ is a rotation matrix, provided the matrix multiplications generating $U_k$ are preformed on an ideal machine with infinite precision.

In actuality, however, one can only approximate the ideal situation. In general, the coefficients of a rotation matrix R cannot be represented exactly with finite precision memory. Thus, any memory representation $\hat{R}$ of a rotation matrix R must necessarily be approximate:

$$\hat{R} = R + \delta,$$

where $\delta$ is an error matrix which includes numeric representation error. In addition to numeric representation error, there are situations where it is desirable to approximate a rotation matrix for the sake of computational efficiency. For example, in order to implement a rotation about one of the axes, say the z axis, through a small angle $\Delta\theta$, it is advantageous to approximate the z axis rotation matrix $R_z(\Delta\theta)$ using the small angle approximations $$\sin(\Delta\theta) \approx \Delta\theta,$$

$$\cos(\Delta\theta) \approx 1.$$

Namely, $$R_z(\Delta\theta) = \begin{bmatrix} \cos(\Delta\theta) & -\sin(\Delta\theta) & 0 \\ \sin(\Delta\theta) & \cos(\Delta\theta) & 0 \\ 0 & 0 & 1 \end{bmatrix} \approx \begin{bmatrix} 1 & -\Delta\theta & 0 \\ \Delta\theta & 1 & 0 \\ 0 & 0 & 1 \end{bmatrix} = \hat{R}_z(\Delta\theta).$$

A matrix-vector product computed with the approximation matrix $\hat{R}_z(\Delta\theta)$ may be computed with two scalar multiplies, whereas a matrix-vector product computed with the original rotation matrix $R_z(\Delta\theta)$ requires four scalar multiplies. Thus, in order to implement a small angle rotation about one of the coordinate axes, it is quite typical to use an approximation to the axial rotation matrix.

Furthermore, consider the situation where a small angle rotation about the x axis is to be followed by a small angle rotation about the y axis. It is possible to implement this pair of rotations by multiplying each vertex $P_i$ of a graphical object by the pair of axial rotations $R_x(\Delta\emptyset)$ and $R_y(\Delta\phi)$, where $\Delta\emptyset$ denotes the angle of rotation about the x axis, and $\Delta\phi$ denotes the angle of rotation about the y axis. This computation would require eight scalar multiplies and four scalar additions per vertex $P_i$. Alternatively, the same pair of rotations may be realized by the approximate rotation matrix $$\hat{R}_{xy}(\Delta\phi, \Delta\phi) = \begin{bmatrix} 1 & 0 & \Delta\varphi \\ 0 & 1 & -\Delta\phi \\ -\Delta\varphi & \Delta\phi & 1 \end{bmatrix},$$

where $\Delta\emptyset$ denotes the angle of rotation about the x axis, and $\Delta\phi$ denotes the angle of rotation about the y axis. Approximation matrix $\hat{R}_{xy}$ is derived by computing the product of the axial rotations $R_x(\Delta\emptyset)$ and $R_y(\Delta\phi)$, and making the small angle replacements for sine and cosine wherever possible. A matrix-vertex product evaluated using the approximate rotation matrix $\hat{R}_{xy}$ requires four scalar multiplies and three scalar additions. Thus, a computational advantage may arise from using the approximate rotation matrix $\hat{R}_{xy}$ instead of the separate axial rotations $R_x(\Delta\emptyset)$ and $R_y(\Delta\phi)$ for generating the pair of successive rotations.

The use of computationally efficient approximations to rotation matrices is especially important for generating continuous real-time rotations of a graphical object. In order to create the illusion of continuous motion for a displayed graphical object, a graphical computing system typically displays multiple frames per second, where the graphical object differs by a slight rotation between successive frames. In order to generate the slight rotation between successive frames in real-time, an approximation to a true rotation matrix is quite frequently employed.

Furthermore, it is noted that a graphical computing system quite often includes a position tracking device such as a mouse or track ball. By reading the horizontal displacement $\Delta u$ and vertical displacement $\Delta v$ of the position tracking device over a small time interval $\Delta t$, it is possible to generate an approximate rotation matrix which corresponds to the instantaneous motion of the position tracking device. For example, a graphical computing system may map the horizontal displacement $\Delta u$ and vertical displacement $\Delta v$ onto the approximate rotation matrix $$\hat{R}_{xy}(\Delta\phi, \Delta\varphi) = \begin{bmatrix} 1 & 0 & \Delta\varphi \\ 0 & 1 & -\Delta\phi \\ -\Delta\varphi & \Delta\phi & 1 \end{bmatrix},$$

using the relations $$\Delta\emptyset = \alpha \cdot \Delta u,$$

$$\Delta\phi = \beta \cdot \Delta v,$$

where $\alpha$ and $\beta$ are proportionality constants. The approximate rotation matrix $\hat{R}_{xy}$ may then be used to generate a rotation of the graphical object between the current frame and the next frame to be displayed. By repeatedly reading the horizontal and vertical displacements from the position tracking device and applying the corresponding approximate rotation matrices $\hat{R}_{xy}$ to update successive frames, a graphical computing system may provide a user manipulating the position tracking device with continuous real-time control of the orientation of a displayed graphical object.

For the reasons elaborated above, in the context of any physical computation of a series of rotations, it is more realistic to consider a series of approximate rotation matrices $\hat{R}_1, \hat{R}_2, \ldots, \hat{R}_n$, where each approximate rotation matrix $\hat{R}_i$ deviates from the corresponding true rotation matrix $R_i$ by an error matrix $\delta_i$:

$$\hat{R}_i = R_i + \delta_i.$$

Error $\delta_i$ may include numerical representation error, approximation error, and/or measurement error (if the rotation matrix is derived from physical measurements). Furthermore, the matrices $U_k$ which generate the vertices $\{P_i^{(k)}\}$ in the second method discussed above are approximated by matrices $\hat{U}_k$ computed according to the recursive relation $\hat{U}_k = \hat{R}_k \hat{U}_{k-1}$ with $\hat{U}_0 = I$. If each matrix $\hat{U}_j$ departs from matrix $U_j$ by error matrix $\epsilon_j$, i.e., $\epsilon_j = \hat{U}_j - U_j$, then $$\hat{U}_k = \hat{R}_k \hat{U}_{k-1} = (R_k + \delta_k)(U_{k-1} + \epsilon_{k-1}) = R_k U_{k-1} + R_k \epsilon_{k-1} + \epsilon_k U_{k-1} + \delta_k \epsilon_{k-1} + \delta_c,$$

where $\delta_c$ is a computation error matrix due to performing the matrix multiplications with finite precision hardware. Since matrix $U_k = R_k U_{k-1}$ is a true rotation matrix, approximation matrix $\hat{U}_k$ departs from a true rotation by error $$\epsilon_k = \hat{U}_k - U_k = R_k \epsilon_{k-1} + \delta_k U_{k-1} + \delta_k \epsilon_{k-1} + \delta_c.$$

The recursive structure of this equation implies that the approximation error $\epsilon_k$ may grow at an exponential rate. Thus, as index k increases, the approximate orientation matrices $\hat{U}_k$ will eventually diverge significantly from being a true rotation matrix. In practice, this means that the rotated vertices $\{P_i^{(k)}\}$ generated from approximation matrix $\hat{U}_k$ may exhibit unwanted visual artifacts, i.e., visual features which are manifestly inconsistent with a physical rotation. A need therefore exists for a system and method which operates on an approximate rotation matrix M to produce a resultant matrix S(M) which is significantly closer to being a true rotation than the approximate rotation matrix M. In other words, a system and method is desired which compensates for the accumulated error in an approximate rotation matrix. Furthermore, a need exists for an improved multiplication operator on a pair of approximate rotation matrices A and B which could be used to estimate the ordinary matrix product AB, where the resultant L of the improved multiplication operator is closer to being a true rotation than the ordinary matrix product AB.

SUMMARY OF THE PRESENT INVENTION

The present invention comprises a system and method for improved rendering of graphical rotations. The system includes a processor, a system memory, a display screen, and optionally a graphics accelerator. The processor executes a software program stored in system memory. The software program accesses a matrix M which resides in system memory. Alternatively, the matrix M may reside in a data cache or in registers internal to the processor. The processor, under control of the software program, applies a matrix operator to the matrix M, where the matrix operator has the properties of consistency on the set of rotation matrices, and attraction to the set of rotation matrices. The software program renders an image of the graphical object on the display screen using the matrix result L from applying the matrix operator. The attraction property of the operator implies that the matrix result L will be closer to being a true rotation than matrix M. Thus, the displayed image rendered using the resultant matrix L has a more accurate and visually satisfying appearance than would an image rendered using matrix M.

The matrix M may be obtained by multiplying two or more approximate rotation matrices. For example, a first approximate rotation matrix may represent an initial orientation for the graphical object, and a second approximate rotation matrix may represent a desired rotation to be applied to the graphical object. The second approximate rotation may be generated in response to a user input command via a mouse, track ball, or any of a variety of position/angle sensing devices.

The present invention also contemplates a system in which the processor, after having calculated the resultant matrix L by applying the operator to the matrix M, transmits the resultant matrix L to a graphics accelerator. The graphics accelerator then performs the computationally intensive task of rendering the graphical image corresponding to the resultant matrix L. This may involve multiplying the vertices of a graphical object by the resultant matrix L to obtain updated vertices.

The present invention also contemplates a method for improved rendering of a repetitive series of rotations of a graphical object on a display screen. A processor operating under the control of a software program iteratively performs a series of steps as follows:

(i) generate an approximate rotation matrix B;

(ii) multiply the approximate rotation matrix B by a second approximate rotation matrix A to generate a matrix M;

(iii) conditionally operate on the matrix M with a matrix operator S to obtain resultant matrix L, i.e., L←S(M), where the matrix operator S exhibits the properties of consistency on the rotation matrices and attraction to the rotation matrices; and (iv) render an updated rotation for the graphical object using the if the matrix operator was not applied, or the resultant matrix L if the matrix operator was applied.

The rotation matrix B may be generated from user inputs supplied via a sensing device or from orientation information provided by a stored data structure. The matrix M from a current iteration may be assigned as the second approximate rotation matrix A for the next iteration, i.e., A←M.

The step of operating on the matrix M with the matrix operator may be performed in every $N^{th}$ iteration of the processing loop. The number N of iterations between updates may be any integer greater than or equal to one. The periodic (or pseudo-periodic) application of the matrix operator may advantageously control the computational and approximation errors which accumulate in matrix M through successive iterations.

Alternatively, the step of operating on the matrix M with the matrix operator may be performed in response to the detection of a predetermined amount of error in the matrix M, wherein error comprises a measure of the departure of matrix M from the set of rotations.

DETAILED DESCRIPTION OF THE INVENTION

Figure 2:
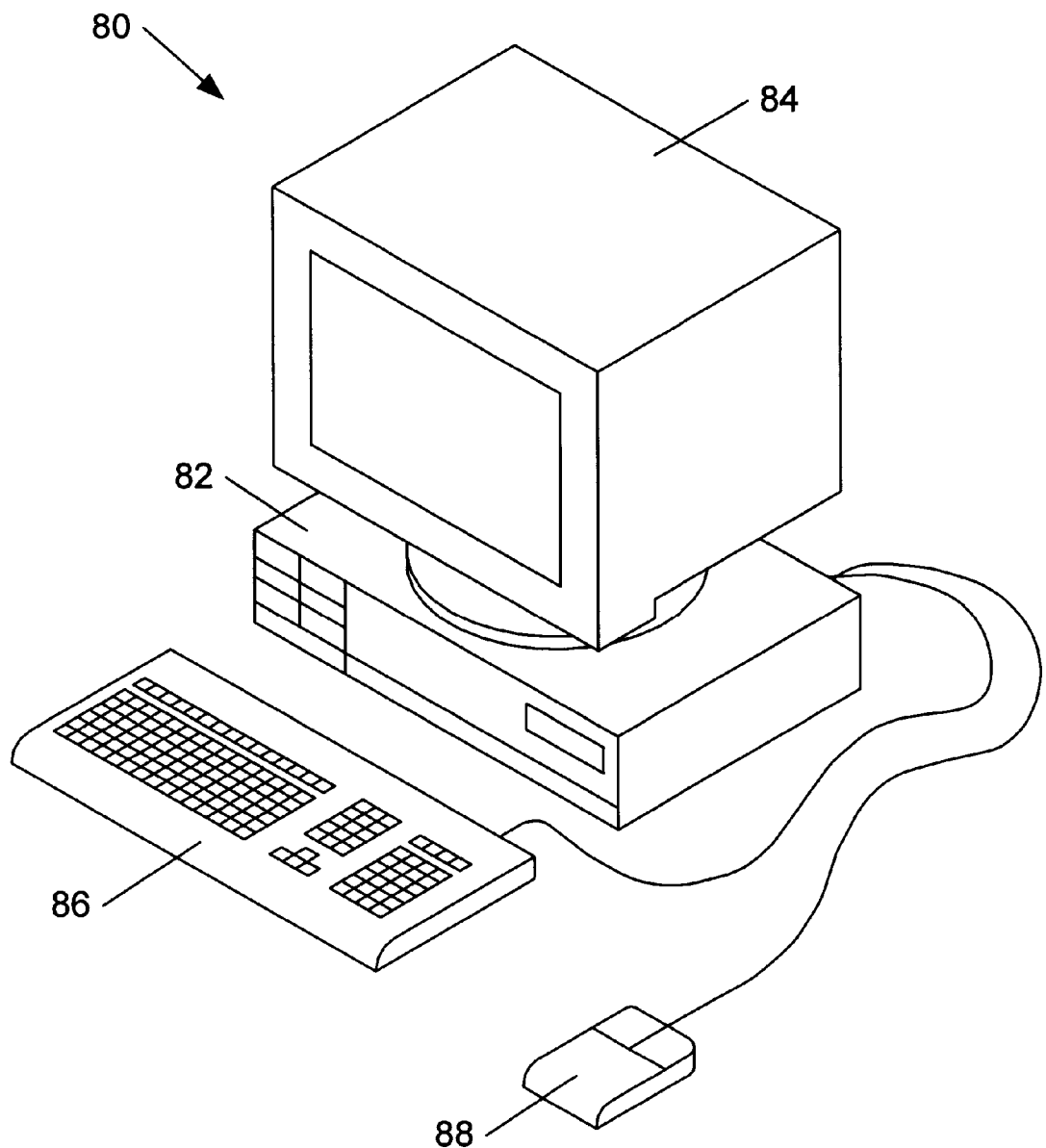
FIG. 2 illustrates a graphical computing system according to the present invention.

Referring now to FIG. 2, a graphical computing system 80 according to the present invention is shown. As shown, graphical computing system 80 comprises a system unit 82, and a display device 84 coupled to the system unit 82. The display device 84 may be any of various types of video monitors or graphical displays. Various input devices may be connected to graphical computing system 80, including a keyboard 86 and/or a position tracking device 88. Examples of a position tracking device include a mouse, track ball, etc. Application software may be executed by graphical computing system 80 to display 3-D graphical objects on display device 84.

Figure 1:
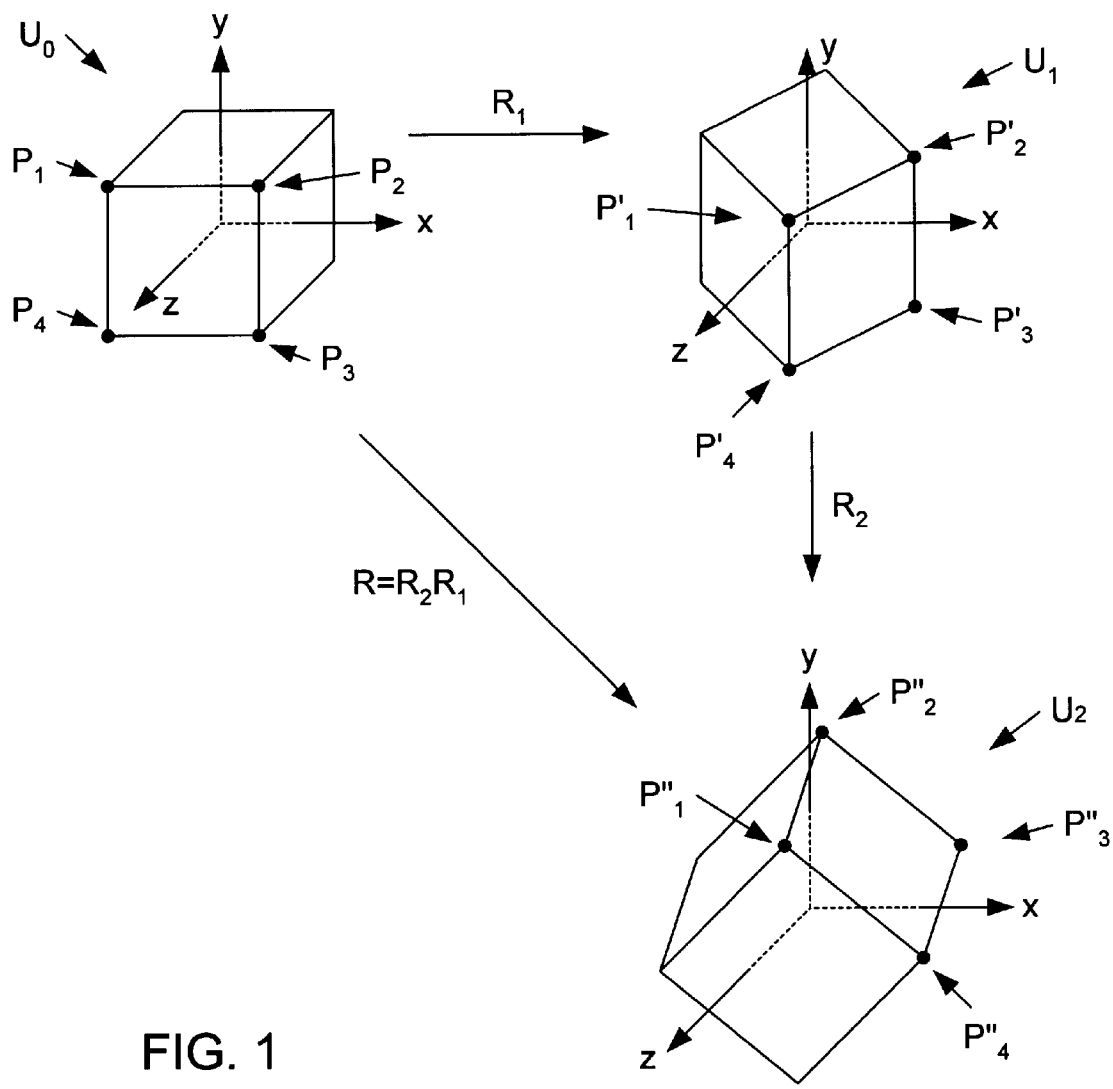
FIG. 1 illustrates a pair of rotations applied in succession to a cube centered at the origin of a three-dimensional space.
Figure 3:
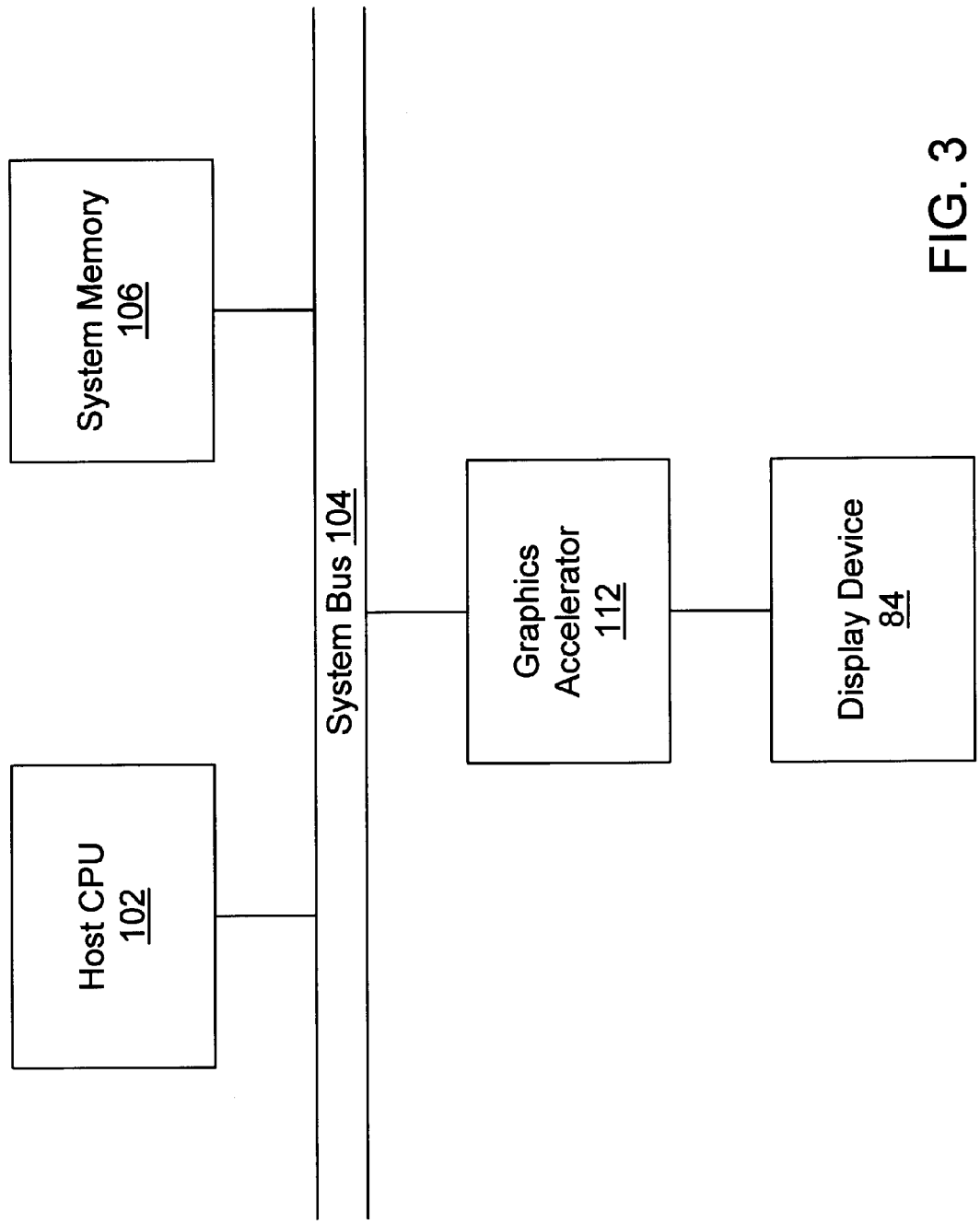
FIG. 3 depicts a block diagram of the graphical computing system according to the present invention.

Referring now to FIG. 3, a simplified block diagram illustrating graphical computing system of FIG. 1 is shown. As shown, graphical computing system 80 includes a central processing unit (CPU) 102 coupled to a high speed bus or system bus 104. A system memory 106 is also preferably coupled to system bus 104. The system memory 106 may include any of various types of memory subsystems including random access memory and/or mass storage devices.

A optional 3-D graphics accelerator 112 may be coupled to system bus 104. [If 3D accelerator 112 is not included in graphical computing system 80, then display device 84 couples directly to system bus 104.] The 3-D graphics accelerator 112 may be coupled to system bus 104 by, for example, a cross bar switch or other bus connectivity logic. It is assumed that various other peripheral devices, or other buses, may be connected to system bus 104, as is well known in the art. It is noted that the 3-D graphics accelerator may be coupled to any of various buses, as desired. As shown, display device 84 connects to 3-D graphics accelerator 112. CPU 102 may transfer information to and from the graphics accelerator 112 according to a programmed input/output (I/O) protocol over the host bus 104. Furthermore, the graphics accelerator 112 may access system memory 106 according to a direct memory access (DMA) protocol or through intelligent bus mastering.

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three dimensional geometry data that defines three dimensional graphics elements for output on a display device. The application program causes the host processor to transfer the geometry data to the graphics accelerator. The graphics accelerator receives the geometry data and renders the corresponding graphics elements on the display device. One of the goals of many computer graphics systems is to render objects that are realistic to the user. The problem of visual realism, however, is quite complex. Objects in the "real world" include an incredible amount of detail, including subtle variations in color, reflections, and surface irregularities. Applications which display three-dimensional graphics require a tremendous amount of processing capabilities. For example, for a computer system to generate smooth 3-D motion video, the computer system is required to maintain a frame rate or update rate of between 20 to 30 frames per second.

In many circumstances, a need arises for the ability to compose two rotations, or approximate rotations, to generate a composite rotation. Given two approximate rotation matrices $A_1$ and $A_2$, the product matrix $A_2A_1$ represents the net effect of applying the two approximate rotations in succession.

A matrix U is said to be a rotation matrix if it obeys the properties $UU^t=I$ and $\det(U)=1$. The set of all such rotation matrices is called the special orthogonal group SO(n) wherein n denotes the number of columns in the matrix U [or equivalently, the number of rows since U is a square matrix]. The following discussion will be presented in terms of 3×3 matrices and the special orthogonal group SO(3), since these are commonly utilized in 3-D computer graphics applications. However, this discussion directly generalizes to arbitrary dimensions n.

In order to discuss the amount of departure of a matrix from the group of rotations SO(3), one must be able to measure the distance between two matrices, or more fundamentally, to measure the length of a single matrix. Given a method for measuring the length of a matrix X, denoted $\|X\|$, the distance between two matrices Y and Z may be calculated by measuring the length of the difference matrix, i.e. $\|Y-Z\|$, wherein the matrix difference $Y-Z$ is computed component-wise.

Suppose that the matrices $A_1$ and $A_2$ are approximations of rotation matrices $U_1$ and $U_2$ respectively, i.e. $A_1=U_1+\delta_1$ and $A_2=U_2+\delta_2$, where $\delta_1$ and $\delta_2$ are matrices which represent the respective approximation errors. The matrix product $A_2A_1$ has the form $$A_2A_1=U_2U_1+\delta_2U_1+U_2\delta_1+\delta_2\delta_1.$$

The last three terms represent the deviation of the product $A_2A_1$ from a rotation matrix, since the product $U_2U_1$ is a rotation matrix. [Recall that the product of two rotation matrices is itself a rotation matrix]. Notice that the two error matrices $\delta_1$ and $\delta_2$ each contribute linearly, and together they contribute quadratically to the deviation. Thus, this deviation may be significantly larger than either of the error matrices $\delta_1$ and $\delta_2$:

$$\|A_2A_1-U_2U_1\|>\|\delta_1\|,\|\delta_2\|.$$

According to the present invention, there exist operators S which operate on the product $A_2A_1$ so that the resultant matrix $S(A_2A_1)$ is closer to a rotation matrix than the product $A_2A_1$. In fact, the class of operators S which are desirable have the following properties: (a) consistency on the rotation group SO(3), (b) stability in a neighborhood of the rotation group SO(3), and (c) attraction to the rotation group SO(3).

Figure 4:
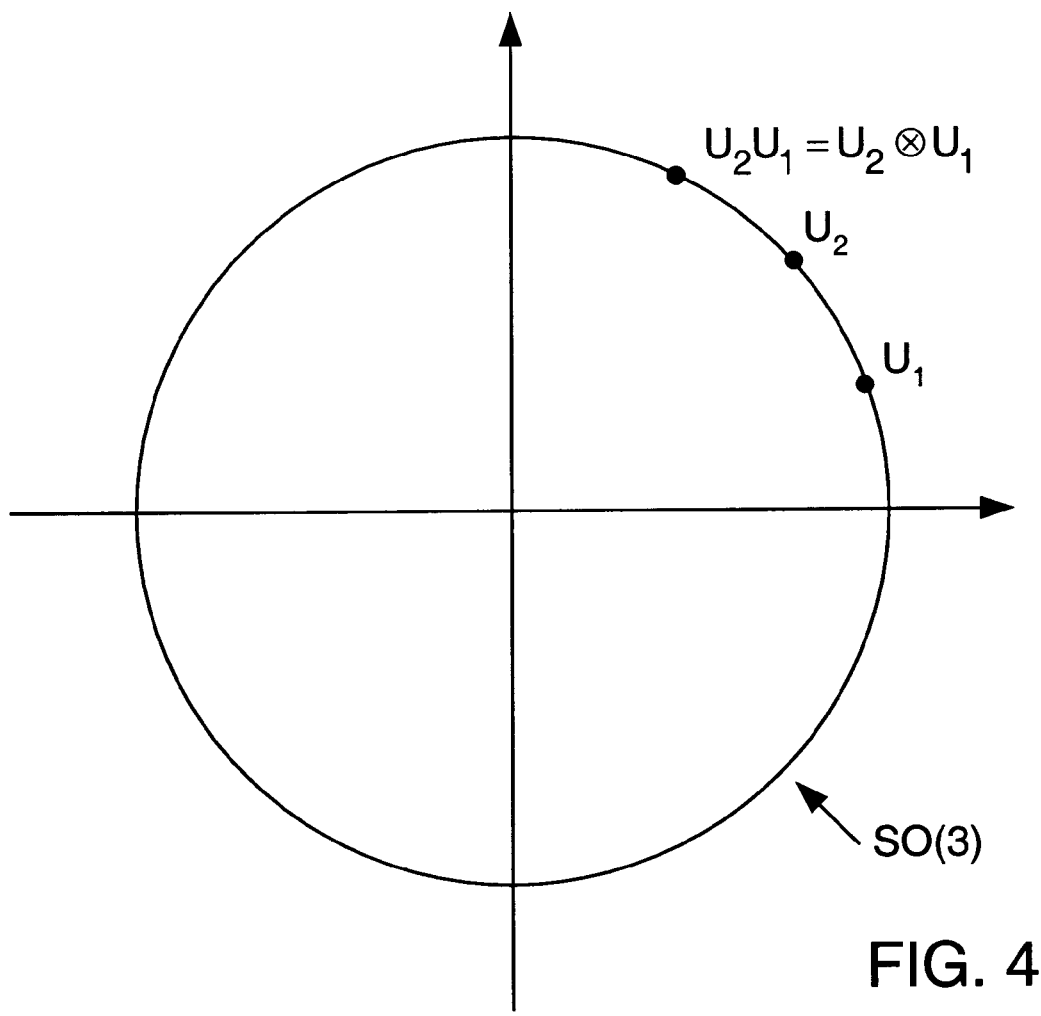
FIG. 4 illustrates the property of consistency on the rotation group for a matrix operator.

FIG. 4: Consistency on the Rotation Group SO(3)

Referring now FIG. 4, an illustration of a matrix operator being consistent on the rotation group is presented. The rotation group SO(3) is depicted as a circle for the sake of discussion. In reality, however, the rotation group SO(3) is a three-dimensional object residing in the nine-dimensional space consisting of all 3 x 3 matrices. An operator ⊗ on a pair of matrices is said to be consistent on the rotation group SO(3) if the operator reduces to ordinary matrix multiplication on rotation matrices. In other words, given arbitrary rotation matrices $U_1$ and $U_2$, the operator ⊗ is consistent on the rotation group if $U_2 \otimes U_1 = U_2 U_1$. [Recall that the ordinary matrix product of two rotation matrices is another rotation matrix assuming infinite precision calculations.]

Figure 5A:
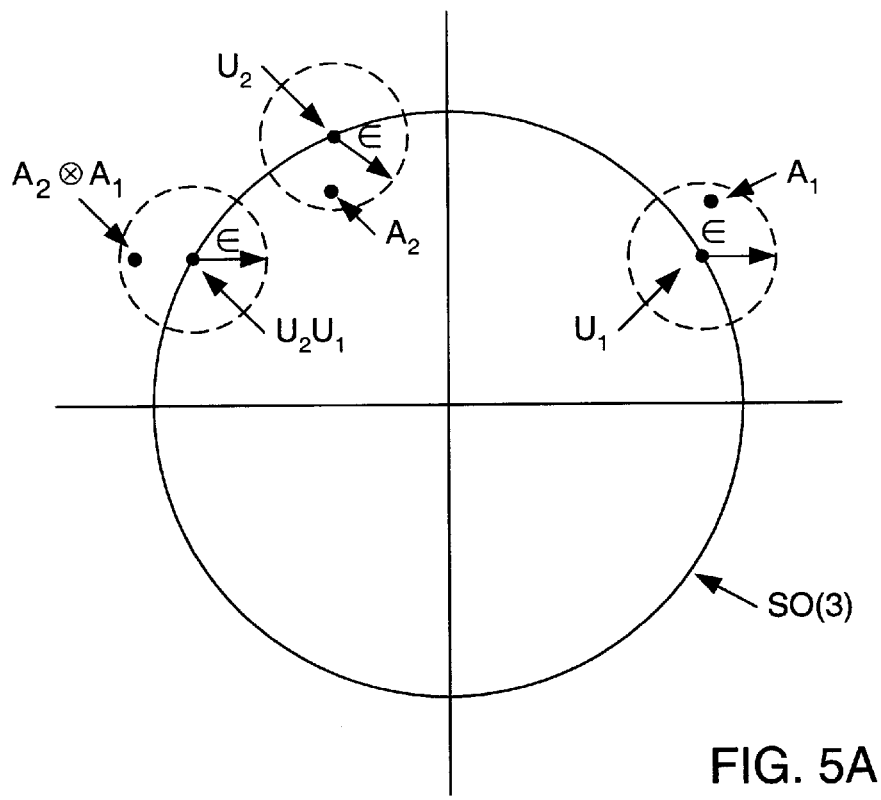
FIG. 5A illustrates the property of stability in a neighborhood of the rotation group for a matrix operator.
Figure 5B:
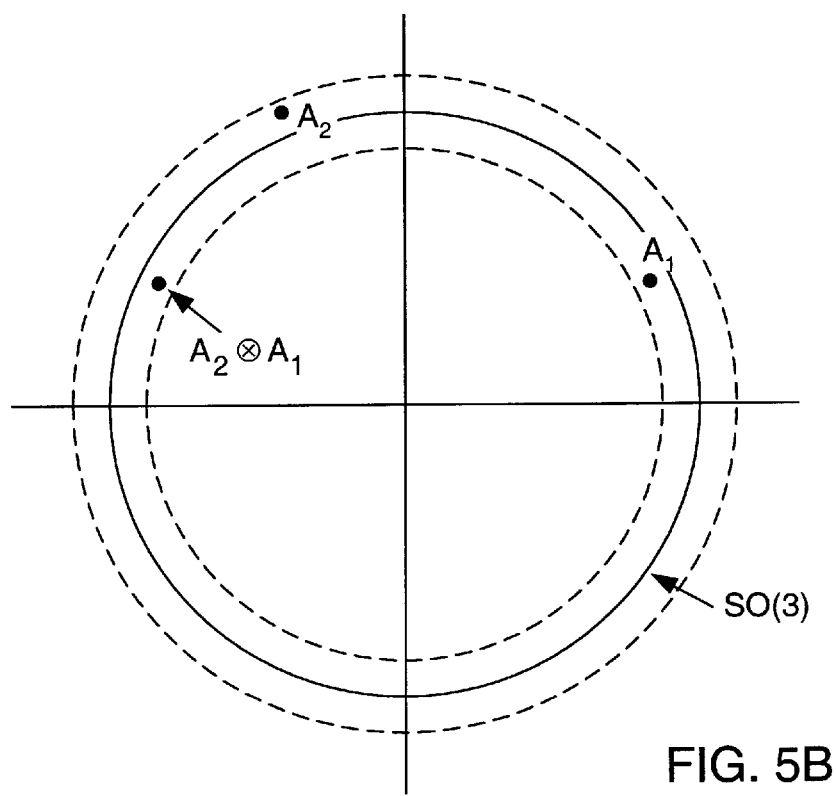
FIG. 5B illustrates an alternative interpretation of the stability property.

FIGS. 5A & 5B: Stability within a Neighborhood of the Rotation Group

Referring now to FIG. 5A, an illustration of an operator being stable in a neighborhood of the rotation group is presented. An operator ⊗ is stable in a neighborhood of the rotation group if there exists an $\epsilon > 0$ such that: if $A_1$ and $A_2$ are two matrices each within $\epsilon$ distance of corresponding rotation matrices $U_1$ and $U_2$, $$\|A_1 - U_1\| < \epsilon \text{ and } \|A_2 - U_2\| < \epsilon,$$

then the result $A_2 \otimes A_1$ will also be within e distance of a rotation matrix, $$\|A_2 \otimes A_1 - U_2 U_1\| < \epsilon.$$

Referring now to FIG. 5B, a second way to visualize the stability property is illustrated. Intuitively, an operator ⊗ is stable if there exists a small enough neighborhood about the rotation group, depicted as an annular band around the rotation group SO(3), so that any two matrices $A_1$ and $A_2$ in this neighborhood will give a result $A_2 \otimes A_1$ which is also within the neighborhood.

Figure 6:
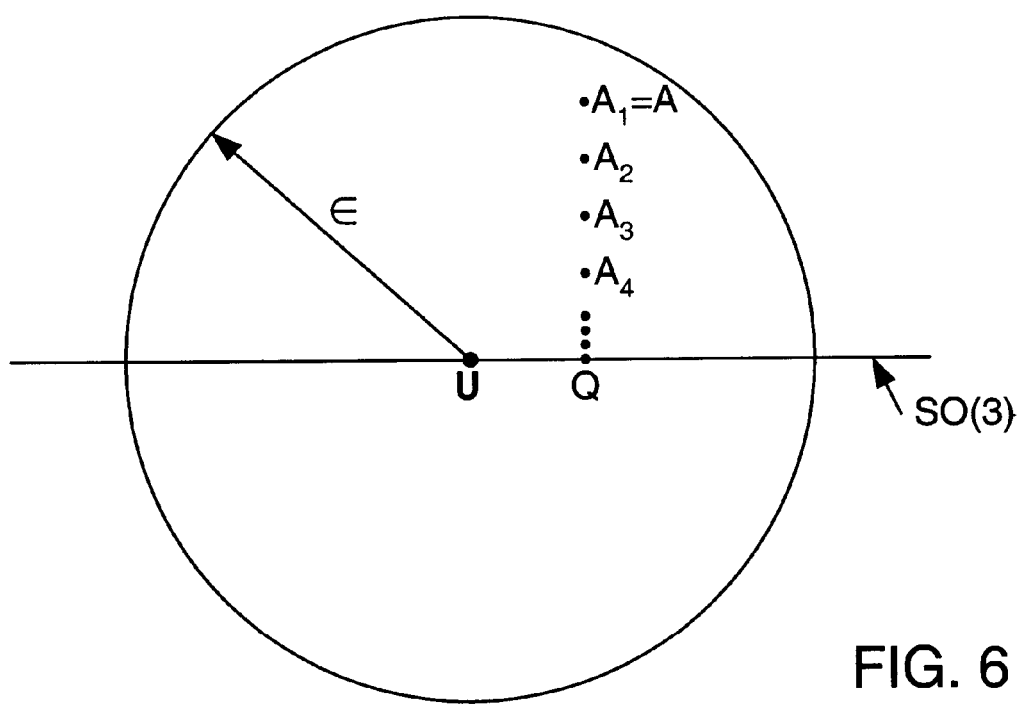
FIG. 6 illustrates the property of attraction to the rotation group for a matrix operator.

FIG. 6: Attraction to the Rotation Group

Referring now to FIG. 6, an illustration of the attraction property is provided. Given an operator ⊗ and a matrix A, one may construct a sequence $A_n$ of matrices by repeatedly operating with the identity matrix I. Namely, let $$A_1 = A,$$

and $$A_{k+1} = A_k \otimes I$$

Similarly, one may generate a sequence $A'_n$ by operating on the left with the identity matrix:

$$A'_1 = A,$$

and $$A'_{k+1} = I \otimes A'_k.$$

The operator ⊗ is said to have the property of attraction to the rotation group if one may guarantee the convergence of sequences $A_n$ and $A'_n$ to a common rotation matrix by choosing the starting matrix A sufficiently close to a rotation matrix. In mathematical terms, an operator ⊗ is said to attract to the rotation group SO(3) if there exists an $\epsilon > 0$ such that: for any matrix A within distance $\epsilon$ of the rotation group, i.e.

$$\|A - U\| < \epsilon$$

for some U in the rotation group, the sequences $A_n$ and $A'_n$ converge to some rotation Q in the rotation group:

$$A_n \to Q,$$

and $$A'_n \to Q.$$

EXAMPLE 1

An Operator Exhibiting the Properties of FIGS. 4–6

Given two arbitrary matrices $A_1$ and $A_2$, define an operator ⊗ according to the formulas:

$$M = A_2 A_1,$$

and $$A_2 \otimes A_1 = \frac{3M - MM'M}{2}.$$

This operator has the properties of consistency on the rotation group, stability in a neighborhood of the rotation group, and attraction to the rotation group as described above in connection with FIGS. 4–6. The consistency of the operator ⊗ may be observed as follows. Given two rotation matrices $U_1$ and $U_2$, it is an elementary exercise to show that the matrix $M = U_2 U_1$ is also a rotation matrix, i.e., matrix M obeys the orthogonality condition $M'M = I$, where I is the identity matrix, and has determinant equal to one. Applying this fact to the defining relation for operator ⊗, it follows that $$U_2 \otimes U_1 = \frac{3M - I \cdot M}{2} = M = U_2 U_1,$$

as required for consistency.

It is noted that any operator $$\otimes_n$$

of the form $$A_2 \underset{n}{\otimes} A_1 = \sum_{k=0}^{n} \alpha_k M(M'M)^k$$

with appropriately chosen coefficients $\alpha_k$ may possess the properties of consistency on the rotation group, stability in a neighborhood of the rotation group, and attraction to the rotation group as described above. The integer n which specifies the number of terms in the operator $$\otimes_n$$

may take any integer value greater than or equal to one.

EXAMPLE 2

Another Operator Exhibiting the Properties of FIGS. 4–6

Given two arbitrary matrices $A_1$ and $A_2$, define an operator * according to the formulas:

$$M = A_2 A_1,$$

and $$A_2 * A_1 = \frac{M + M^{-t}}{2},$$

where $M^{-t}$ denotes the inverse transpose of matrix M. This operator also has the properties of consistency on the rotation group, stability in a neighborhood of the rotation group, and attraction to the rotation group. The consistency property may be observed as follows. Given two rotation matrices $U_1$ and $U_2$, the product matrix $M=U_2U_1$, as mentioned above, obeys the orthogonality condition $MM^t=I$, or equivalently $M^{-t}=M$. Thus, $$U_2 * U_1 = \frac{M + M}{2} = M = U_2 U_1$$

as required for consistency.

The operators $$\otimes, \underset{n}{\otimes} \text{ and } *$$

introduced above may be advantageously used to yield matrices which are closer to being true rotations. Thus, they may serve to compensate the error accumulated in a matrix product of approximate rotations. Generally, operator $\otimes$ is preferred over operator *, since the former operator avoids the computation of a matrix inverse.

Embodiments of a Graphical Computing System and Method

Figure 7:
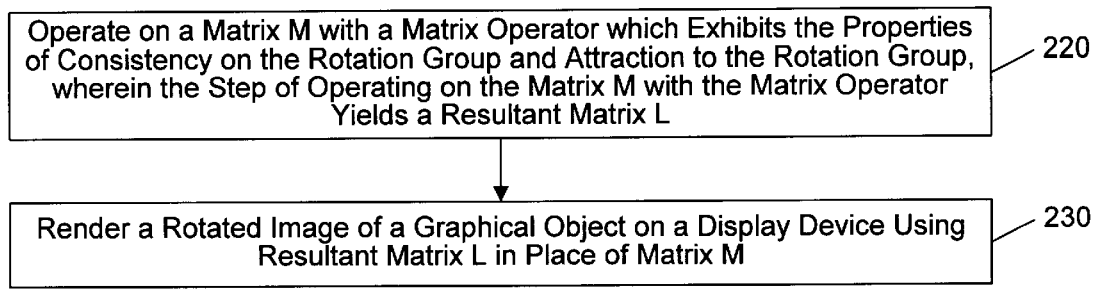
FIG. 7 depicts one embodiment of a method for improved rendering of a rotation on a display screen based on a class of operators according to the present invention.

As shown in FIG. 7, one embodiment of the present invention includes a system and method for improved rendering of a rotation on a display screen based on a class of operators which exhibit the properties of (i) consistency on the rotation group, and (ii) attraction to the rotation group. In step 220, a software program executing on central processing unit 102 operates on a matrix M with a matrix operator in the class defined above. It is assumed that the matrix M an approximate rotation matrix within the neighborhood of attraction to the rotation group for the matrix operator. In the preferred embodiment of step 220, the software program uses operator $\otimes$ discussed above in Example 1, i.e.

$$S_\otimes(M) = \frac{3M - MM^tM}{2}.$$

In alternate embodiments of step 220, one of the operators $$\underset{n}{\otimes}$$

with n larger than 1, or operator * of Example 2 may be used to operate on the matrix M.

Let L denote the matrix result of applying the matrix operator to the matrix M. Since the matrix operator has the property of attraction to the rotation group, the resultant matrix L will more closely approximate a true rotation matrix than the matrix M. Thus, in step 230, the software program renders a rotated image of a graphical object on display screen 84 using the resultant matrix L instead of the matrix M. Step 230 includes multiplying the vertices of the graphical object by resultant matrix L to generate updated vertices in the rotated orientation. Since matrix L is closer to a true rotation matrix than matrix M, the rotated image of the graphical object rendered on the basis of matrix L will appear less distorted than if the image were rendered on the basis of matrix M.

In an alternate embodiment of step 230, software program provides the resultant matrix L to graphics accelerator 112. Graphics Accelerator 112 performs the matrix-vertex multiplications using the resultant matrix L. The updated vertices are supplied to the display device 84.

In one embodiment of step 220, the matrix operator is applied more than once. In other words, the matrix operator may be applied to the matrix M to generate a first resultant matrix $L_1$. The matrix operator may be applied a second time to first resultant matrix $L_1$ to generate a second resultant matrix $L_2$. After each successive application of the matrix operator, the resultant matrix $L_k$ approximates a true rotation more accurately than the previous resultant matrix $L_{k-1}$. The final resultant matrix $L_{final}$ may be used to render the rotated image of the graphical object on the display device 84.

Figure 8:
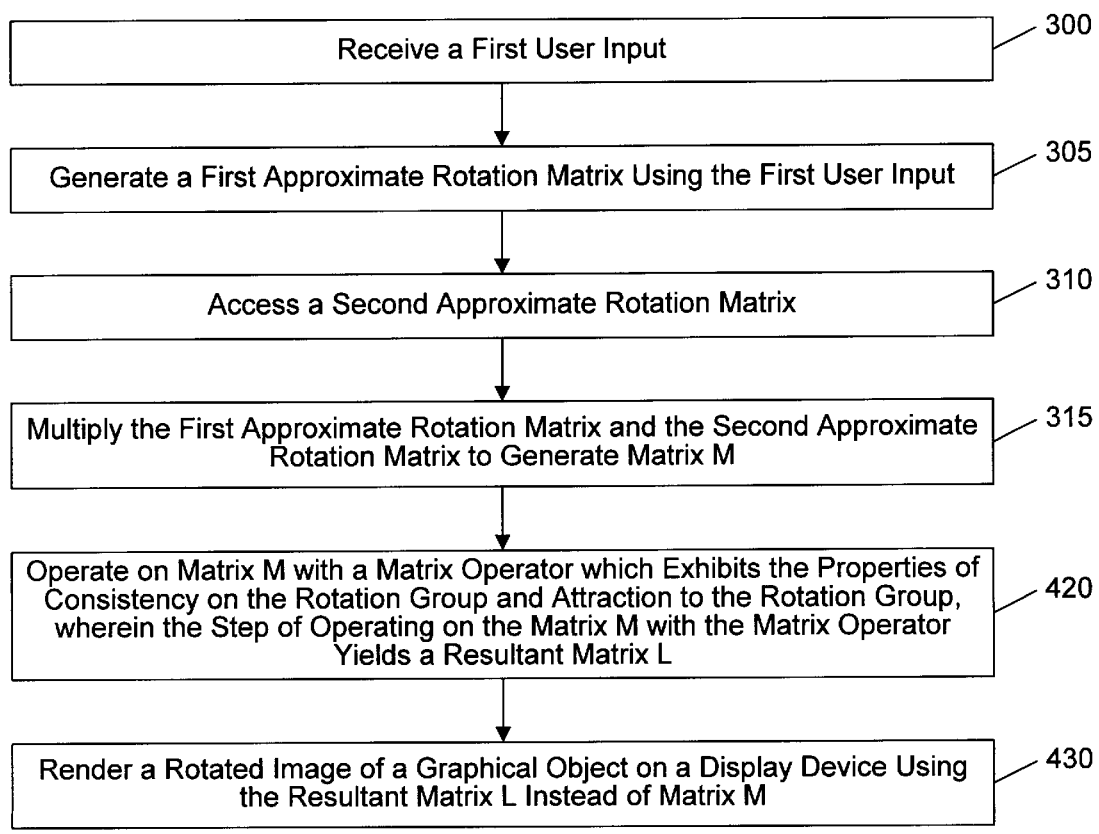
FIG. 8 depicts an embodiment of a method for improved rendering of a rotation on a display screen, where a product of two approximate rotation matrices is projected closer to a rotation matrix.

Referring now to FIG. 8, a second embodiment of the present invention is presented. In step 300, a software program executing on CPU 102 receives a user input from position tracking device 88. The user input may represent a desired rotation to be applied to a graphical object. In step 305, the software program generates a first approximate rotation matrix corresponding to the user input. In step 310, the software program accesses a second approximate rotation matrix which may represent the current orientation of the graphical object. In step 315, the software program multiplies the first approximate rotation operand and the second approximate rotation operand to generate a matrix M.

In step 420, the software program operates on the matrix M with a matrix operator having the properties (i) and (ii) described above. In the preferred embodiment of step 420, the software program uses operator $\otimes$ discussed above in Example 1. In alternate embodiments of step 420, one of the operators $$\underset{n}{\otimes}$$

with n larger than 1, or operator * of Example 2 may be used to operate on the matrix M.

Let L denote the matrix result of applying the matrix operator to the matrix M. In step 430, the resultant matrix L is used in place of matrix M to render a rotated image of a graphical object on a display screen. Since the resultant matrix L is closer to a true rotation matrix than the matrix M, the rendering of the updated orientation of the displayed graphical object using the resultant matrix L will exhibit a more accurate appearance (less distortion) than if the matrix M were used for rendering the updated orientation.

In an alternate embodiment of step 430, the software program provides the resultant matrix L to graphics accelerator 112. Graphics accelerator 112 performs the rendering calculations to generate the rotated vertices of the graphical object using the resultant matrix L. Thus, the host processor 102 may advantageously operate with increased efficiency since it is liberated from computationally intensive task of performing the display rendering calculations.

Figure 9:
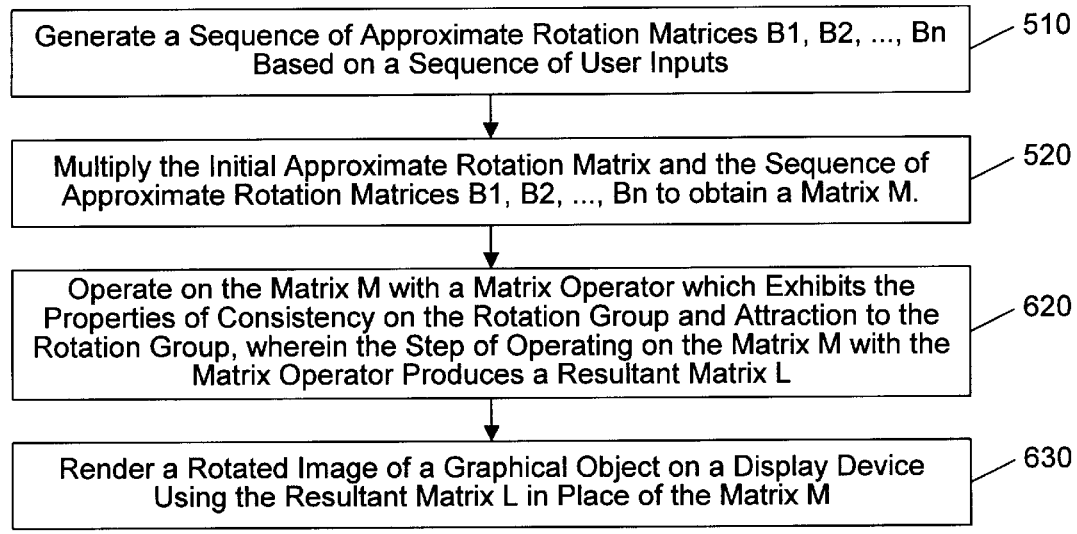
FIG. 9 depicts an embodiment of a method for improved rendering of a rotation on a display screen, where a product of a sequence of approximate rotation matrices is projected closer to a rotation matrix.

Referring now to FIG. 9, a third embodiment of the present invention is presented. In step 510, a software program executing on CPU 102 generates a sequence of approximate rotation matrices $B_1, B_2, \ldots, B_n$ based on a sequence of user inputs. In one embodiment of step 510, the software program reads a horizontal displacement $\Delta u$ and a vertical displacement $\Delta v$ of position tracking device 88 over a small time interval Δt, and uses the displacements Δu and Δv to generate an approximate rotation matrix. For example, the software program may map the horizontal displacement Δu and vertical displacement Δv onto the dual axis approximate rotation matrix $$\hat{R}_{xy}(\Delta\phi, \Delta\varphi) = \begin{bmatrix} 1 & 0 & \Delta\varphi \\ 0 & 1 & -\Delta\phi \\ -\Delta\varphi & \Delta\phi & 1 \end{bmatrix},$$

using the relations $$\Delta\varphi = \alpha \cdot \Delta u,$$

$$\Delta\phi = \beta \cdot \Delta V,$$

where α and β are proportionality constants. The sequence of approximate rotation matrices $B_1, B_2, \ldots, B_n$ may be generated by repeatedly reading position tracking device 88 and mapping each reading or set of readings onto a corresponding approximate rotation matrix.

In a second embodiment of step 510, the sequence of approximate rotation matrices $B_1, B_2, \ldots, B_n$ may be generated by reading a series of input values from one or more sensing systems configured to detect the orientation of the user's head and/or eyes. As the user moves his/her head and/or eyes, the one or more sensing systems report this orientation information as a set of sensor measurements. The software program repeatedly reads the sensor measurements and maps each set of sensor measurements onto an approximate rotation matrix $B_k$ which corresponds to the instantaneous change in orientation of the user's head and/or eyes in physical space. This embodiment may be especially useful in virtual reality systems.

In a third embodiment of step 510, the sequence of approximate rotation matrices $B_1, B_2, \ldots, B_n$ are generated from information stored in a data structure in system memory 106. The data structure may store a sequence of entries where each entry determines one of the approximate rotation matrices $B_k$. For example, each entry may store an angle and an indication of one of the axes. In this case, the software program reads the angle and axis indication, and generates the corresponding axial rotation matrix for each entry in the data structure.

In step 520, the software program multiplies an initial approximate rotation matrix and the sequence of approximate rotation matrices $B_1, B_2, \ldots, B_n$ to obtain a matrix M. The initial approximate rotation matrix may represent the initial orientation of a graphical object. In step 620, the software program operates on the matrix M with an operator having properties (i) and (ii) described above.

In step 620, the software program renders a rotated image of the graphical object on display screen 84 using the resultant matrix L in place of matrix M. Since resultant matrix L is closer to a true rotation than matrix M, the rotated image rendered using resultant matrix L appears more naturally consistent with a physical rotation than if matrix M were used. In an alternate embodiment of step 620, the software program provides the resultant matrix L to graphics accelerator 112, and graphics accelerator 112 performs the rendering of the rotated image.

Figure 10:
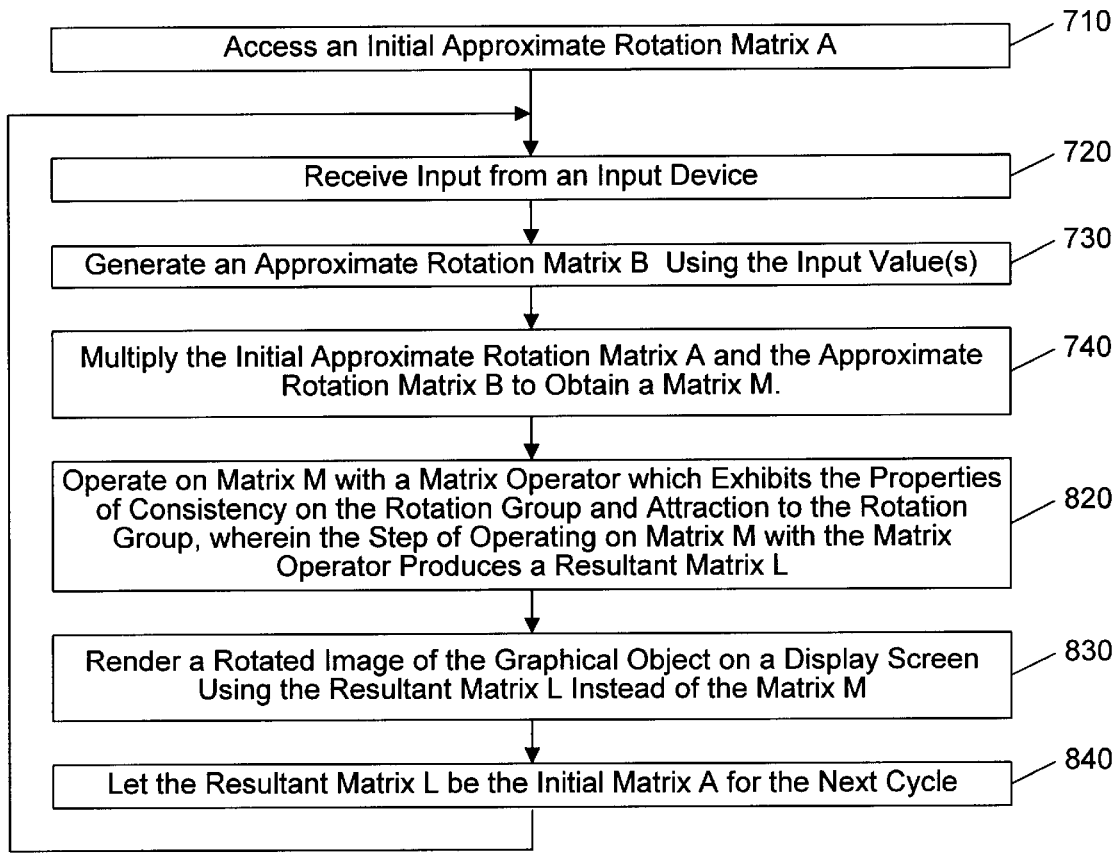
FIG. 10 depicts an embodiment of a method for improved rendering of a continuous series of rotations on a display screen, where accumulated calculation and approximation errors are compensated by application of a matrix operator.

Referring now to FIG. 10, a fourth embodiment of the present invention is presented. In this embodiment, the software program cyclically performs steps 720–740 and steps 820–840. In step 710, the software program accesses an initial approximate rotation matrix A which represents the initial orientation of a graphical object. In step 720, the software program receives an input from an input device such as position tracking device 88 or virtual reality sensor subsystem. In step 730, the software program generates an approximate rotation matrix B using the input value(s) read from the input device. In step 740, the software program multiplies the initial approximate rotation matrix A and the approximate rotation matrix B to obtain a matrix M. It is noted that in a first cycle of FIG. 10, the initial approximate rotation matrix A may be the identity matrix. In this case, the multiplication of step 740 is trivial and need not be performed. [Any matrix times the identity matrix is equal to itself].

In step 820, the software program operates on matrix M with a matrix operator which exhibits properties (i) and (ii) described above. Let L denote the resultant matrix from the matrix operator. In step 830, the software program renders a rotated image of the graphical object on a display screen using the resultant matrix L. Since resultant matrix L more closely approximates a rotation than matrix M, the rotated image generated using resultant matrix L has an appearance which is more realistic and consistent with a physical rotation than if matrix M were used to generate the image.

In an alternate embodiment of step 830, the software program provides the resultant matrix L to the graphics accelerator 112. Graphics accelerator 112 then performs the computationally intensive matrix-vector multiplications required for rendering the rotated image of the graphical object.

In step 840, the resultant matrix L from the matrix operator is assigned as the initial matrix A for the next cycle of FIG. 10. Thus, it is apparent that the errors which accumulate in the multiplication step 740 are compensated by the application of the matrix operator in step 820 for each cycle of FIG. 10.

Figure 11A:
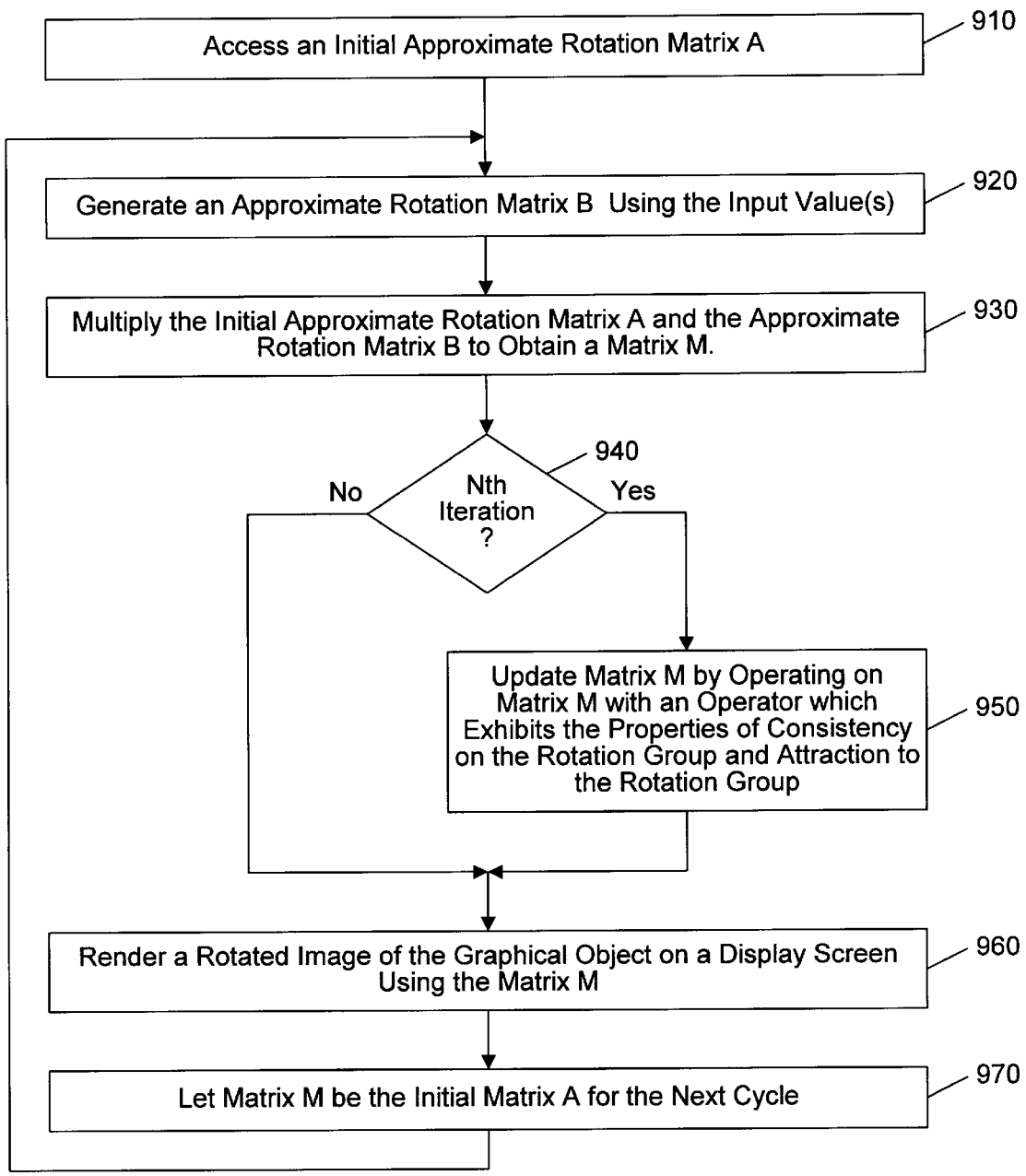
FIG. 11A depicts an embodiment of a method for improved rendering of a continuous series of rotations on a display screen, where accumulated calculation and approximation error are compensated by application of a matrix operator on a periodic (or pseudo-periodic) basis.

Referring now to FIG. 11A, a fifth embodiment of the present invention is presented. In this embodiment, the software program cyclically performs steps 920–970. In step 910, the software program accesses an initial approximate rotation matrix A which represents the initial orientation of a graphical object. In step 920, the software program generates an approximate rotation matrix B. As discussed above, the software program may use input value(s) to generate the approximate rotation matrix B. In step 930, the software program multiplies the initial approximate rotation matrix A and the approximate rotation matrix B to obtain a matrix M. It is noted that in a first cycle of FIG. 11A, the initial approximate rotation matrix A may be the identity matrix. In this case, the multiplication of step 930 is trivial and need not be performed. [Any matrix times the identity matrix is equal to itself]. Step 940 is included to indicate that step 950 is performed for every $N^{th}$ cycle through the flowchart of FIG. 11A. If the integer N is equal to one, then step 950 is performed in every cycle through the flowchart. The integer N is greater than or equal to one.

In step 950, the software program updates the matrix M by operating on the matrix M using an operator having the properties (i) and (ii) described above. In other words, the matrix result of operating on matrix M is assigned as the new value of matrix M, i.e., M←Operator(M).

In step 960, the matrix M (which has perhaps been updated in step 950) is used to render a rotated image of a graphical object on display device 82. Since the matrix M is updated by application of the matrix operator after every Nth cycle of the processing loop, the accumulation of approximation and calculation errors may be advantageously controlled. Therefore, the displayed image of the graphical object in step 960 maintains a realistic appearance free from unwanted visual artifacts.

In step 970, the matrix M is assigned to be the initial matrix A for the next cycle of FIG. 11A.

The number N of computation cycles between compensation step 950 may be any integer greater than or equal to one. By choosing the integer N appropriately, the error accumulated in matrix M may be controlled so that matrix M remains within the neighborhood of attraction to SO(3) as described in connection with FIG. 6. Thus, the present embodiment provides a mechanism for controlling and decreasing the error associated with the multiplication of a series of approximate rotation matrices.

The present invention also contemplates alternative embodiments where the number N of iterations between application of the matrix operation is adaptively controlled. Smaller value of N may be used in situations where the approximation and calculation errors accumulate quickly. Correspondingly larger values of N may be used in situations where these errors accumulate more slowly. In one alternate embodiment, the error in matrix M, i.e., the amount by which it departs from a rotation matrix, is estimated. The result of the estimate is used to control when and/or how frequently the step 950 is performed.

Figure 11B:
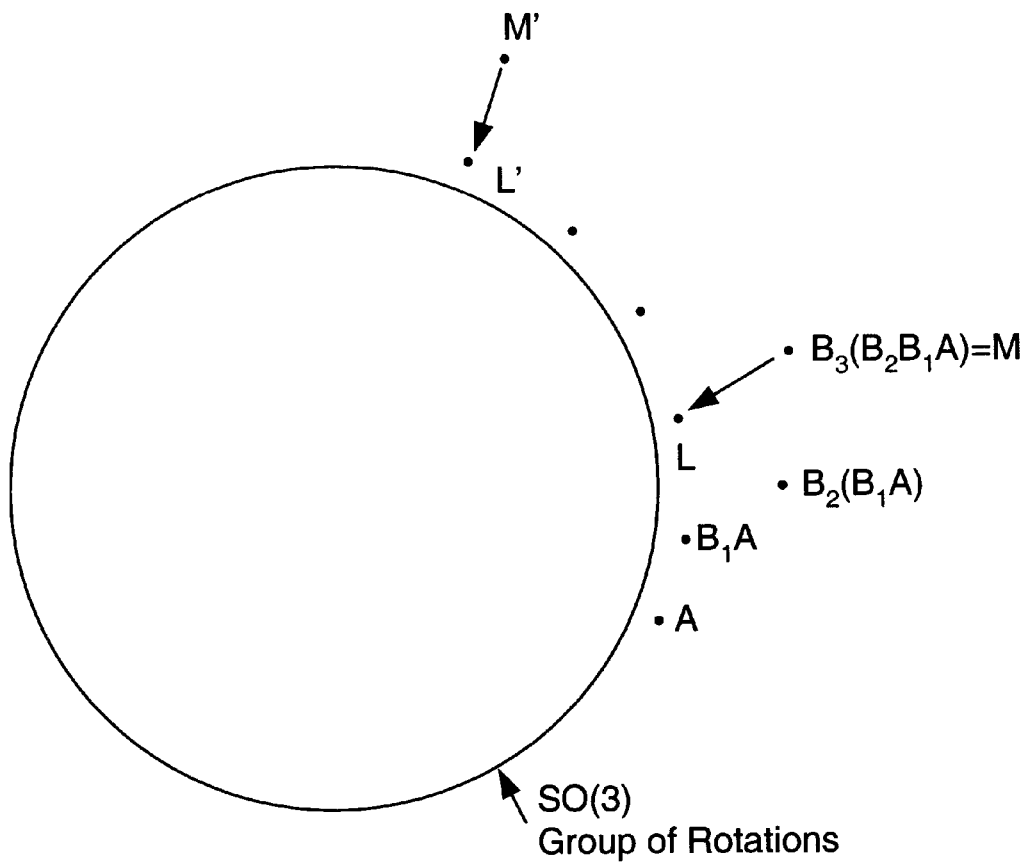
FIG. 11B illustrates the embodiment of FIG. 7A from a geometric viewpoint.

In FIG. 11B, the initial approximate rotation matrix A, and the successive products $C_0 = A,$ $C_1 = B_1 A,$ $C_2 = B_2(B_1 A),$ $C_n = B_n(B_{n-1} \ldots B_2 B_1 A) = M$ generated from the sequence of approximate rotation matrices $B_1, B_2, \ldots, B_n$ in successive cycles of multiplication step 930 are shown as separate points which diverge from the rotation group SO(3). This divergence represents the accumulation of approximation and calculation errors. The application of the matrix operator sends matrix M to the resultant matrix L. Observe that resultant matrix L more closely approximates a rotation matrix since it is closer to the rotation group. The resultant matrix L is used to initiate the second series of N multiplication cycles of FIG. 11A. The second series of successive products terminates with matrix M'. An application of the matrix operator sends matrix M' to resultant matrix L'. By periodically (or pseudo-periodically) applying the matrix operator, the deviation of the intermediate approximate rotation matrices $C_i$ from the rotation group may be controlled to within a predetermined limit η. In other words, each of the successive product matrices $C_i$ will approximate a rotation to within the predetermined limit η: $\|C_i - U_i\| < \eta$ for some corresponding rotation matrix $U_i$.

In one embodiment of step 950, the matrix operator is applied more than once so that the resultant matrix L closer to a rotation matrix than if only one application of the matrix operator were performed.

It is noted that the methods connected with FIGS. 7–11 may be realized in graphics accelerator 112. Such a realization may be especially advantageous for performing rotations in real-time, or for performing a series of rotations on graphical objects with a large number of vertices.

What is claimed is:

1. A method for improved rendering of a rotation of a graphical object on a display screen, the method comprising:

operating on a matrix M with a matrix operator which exhibits a first property of consistency on the rotation group and a second property of attraction to the rotation group, wherein the step of operating on the matrix M with the matrix operator produces a resultant matrix L;

rendering a rotated image of the graphical object on a display screen using the resultant matrix L in place of said matrix M.

2. The method of claim 1, wherein said operating on the matrix M with a matrix operator comprises calculating the resultant matrix L according to the formula $$L = \frac{3M - MM^t M}{2}.$$

3. The method of claim 1, wherein said operating on the matrix M with a matrix operator comprises calculating the resultant matrix L according to the formula $$L = \frac{M + M^{-t}}{2}.$$

4. The method of claim 1, wherein said operating on the matrix M with a matrix operator comprises calculating the resultant matrix L according to a formula of the form $$L = \sum_{k=0}^{n} \alpha_k M (M^t M)^k,$$

wherein the integer n is greater than or equal to one, wherein the coefficients $\alpha_k$ are predetermined constants.

5. The method of claim 1, wherein said operating on the matrix M with a matrix operator includes applying the matrix operator a plurality of times to generate the resultant matrix L.

6. The method of claim 1, wherein said rendering a rotated image of the graphical object on a display screen using the resultant matrix L includes multiplying one or more vertices of the graphical object with the resultant matrix L to obtain rotated vertices for the graphical object.

7. The method of claim 1, further comprising:

receiving a first user input;

generating a first approximate rotation matrix using the first user input;

accessing a second approximate rotation matrix;

multiplying the first approximate rotation matrix and the second approximate rotation matrix to generate the matrix M.

8. The method of claim 7, wherein the user input is supplied by a mouse.

9. The method of claim 7, wherein the user input is supplied by a sliding ball.

10. The method of claim 7, wherein the first user input represents a desired rotation to be applied to a graphical object.

11. The method of claim 1, further comprising:

generating a sequence of approximate rotation matrices $B_1, B_2, \ldots, B_n$;

multiplying an initial approximate rotation matrix and the sequence of approximate rotation matrices $B_1, B_2, \ldots, B_n$ to obtain the matrix M.

12. The method of claim 11, further comprising receiving a sequence of sensor inputs from a sensing device, wherein said generating a sequence of approximate rotation matrices $B_1, B_2, \ldots, B_n$ is controlled by said sensor inputs.

13. The method of claim 12, wherein the sequence of sensor inputs are successive horizontal and vertical displacements of a position tracking device being manipulated by a user.

14. The method of claim 13, wherein the position tracking device is a mouse.

15. The method of claim 13, wherein the position tracking device is a sliding ball.

16. The method of claim 12, wherein the sensing device and said display screen are incorporated in a virtual reality system.

17. A method for improved rendering of a repetitive series of rotations on a display screen, the method comprising:

generating an approximate rotation matrices B;

multiplying the approximate rotation matrix B by a second approximate rotation matrix A to generate a matrix M;

rendering a rotated image of the graphical object on a display screen using the matrix M;

iteratively performing said generating, said multiplying, and said rendering;

wherein said matrix M from a current iteration of said iteratively performing is used as said second approximate rotation matrix A in a subsequent iteration of said iteratively performing;

updating the matrix M by operating on matrix M with an operator which exhibits a property of consistency on the set of rotations, and a property of attraction to the set of rotations, wherein said updating is performed after said multiplying and before said rendering in response to affirmative result of an update test.

18. The method claim 17, wherein said updating the matrix M by operating on said matrix M with said operator includes applying the matrix operator a plurality of times.

19. The method of claim 17, wherein each cycle of said iteratively performing further includes receiving one or more sensor input values from a sensing unit before said generating an approximate rotation matrix B, wherein said generating of said approximate rotation matrix B corresponds to said one or more input values.

20. The method of claim 19, wherein said sensing unit is a mouse.

21. The method of claim 19, wherein said sensing unit is a track ball.

22. The method of claim 17, wherein said update test comprises detecting if a current iteration index is N larger than a previous iteration index for which said updating was performed.

23. The method of claim 22, wherein said update test comprises estimating an amount of error in matrix M.

24. A system with improved rotation rendering of a graphical object, the system comprising:

a memory which stores a matrix M;

a processor coupled to the memory, wherein said processor is operable to transform the matrix M with a matrix operator which exhibits a first property of consistency on the rotation group and a second property of attraction to the rotation group, wherein said transforming of the matrix M with the matrix operator produces a resultant matrix L;

a display screen coupled to the processor, wherein the display screen is operable to display a rotated image of the graphical object, wherein the rotated image is rendered using the resultant matrix L.

25. The system of claim 24, wherein the processor is configured to execute a software program, wherein said processor, under control of said software program, is operable to render the rotated image of the graphical object using the resultant matrix L.

26. The system of claim 25, wherein the rendering of said rotated image includes multiplying a plurality of vertices of the graphical object by said resultant matrix L.

27. The system of claim 24 further comprising a graphics accelerator coupled to said processor, wherein said processor is configured to transmit said resultant matrix L to said graphics accelerator, wherein said graphics accelerator is configured (a) to render the rotated image of the graphical object under said resultant matrix L, and (b) to transmit data corresponding to said rotated image to said display screen.

28. The system of claim 24 further comprising an input unit, wherein said processor, under control of said software program, is operable (a) to read one or more sensor input values from said input unit, (b) to generate a first approximate rotation matrix corresponding to said one or more sensor input values, (c) to access a second approximate rotation matrix from the memory, and (d) to generate the matrix M by multiplying said first approximate rotation matrix and said second approximate rotation matrix.

29. The system of claim 27, wherein said second approximate rotation matrix is a representation of an initial orientation for the graphical object, and said first approximate rotation matrix represents a desired rotation to be applied to the graphical object.

\* \* \* \* \*

UNITED STATES PATENT AND TRADEMARK OFFICE
CERTIFICATE OF CORRECTION

PATENT NO.     : 6,184,896 B1
DATED          : February 6, 2001
INVENTOR(S)    : Henry A. Sowizral and Karel Zikan Page 1 of 1

It is certified that error appears in the above-identified patent and that said Letters Patent is hereby corrected as shown below:

<u>Column 18, claim 29,</u>
Line 41, please delete "claim 27" and substitute -- claim 28 --.

Signed and Sealed this

Ninth Day of April, 2002

Attest:

Attesting Officer

JAMES E. ROGAN
Director of the United States Patent and Trademark Office